US012369616B2

(12) United States Patent
Mua et al.

(10) Patent No.: US 12,369,616 B2
(45) Date of Patent: Jul. 29, 2025

(54) DEHYDRATION OF TOBACCO AND TOBACCO-DERIVED MATERIALS

(71) Applicant: R.J. Reynolds Tobacco Company, Winston-Salem, NC (US)

(72) Inventors: John-Paul Mua, Advance, NC (US); Crystal Dawn Hege Byrd, Lexington, NC (US); Brian Keith Nordskog, Winston-Salem, NC (US); Andries Don Sebastian, Winston-Salem, NC (US); David Troy Turfler, Collierville, TN (US); Christopher Keller, Collierville, TN (US); Jeremy Barrett Mabe, Lexington, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 161 days.

(21) Appl. No.: 17/030,833

(22) Filed: Sep. 24, 2020

(65) Prior Publication Data

US 2021/0007390 A1   Jan. 14, 2021

Related U.S. Application Data

(62) Division of application No. 15/375,695, filed on Dec. 12, 2016, now Pat. No. 10,813,383.

(51) Int. Cl.
| | |
|---|---|
| *A24B 15/22* | (2006.01) |
| *A23K 20/10* | (2016.01) |
| *A23L 2/52* | (2006.01) |
| *A23L 33/105* | (2016.01) |
| *A24B 3/04* | (2006.01) |
| *A24B 9/00* | (2006.01) |
| *A24B 15/24* | (2006.01) |

(52) U.S. Cl.
CPC .............. *A24B 15/22* (2013.01); *A23K 20/10* (2016.05); *A23L 2/52* (2013.01); *A23L 33/105* (2016.08); *A24B 3/04* (2013.01); *A24B 9/00* (2013.01); *A24B 15/241* (2013.01); *A23V 2002/00* (2013.01)

(58) Field of Classification Search
CPC .................................................... A24B 15/22
See application file for complete search history.

(56) References Cited

U.S. PATENT DOCUMENTS

| | | | |
|---|---|---|---|
| 3,646,943 | A | 3/1972 | Blewitt et al. |
| 4,631,837 | A | 12/1986 | Magoon |
| 5,859,412 | A | 1/1999 | Yagi |
| 5,956,865 | A | 9/1999 | Durance et al. |
| 6,128,831 | A | 10/2000 | Durance et al. |
| 6,312,745 | B1 | 11/2001 | Durance et al. |
| 6,539,645 | B2 | 4/2003 | Savarese |
| 9,301,544 | B2 | 4/2016 | Mua et al. |
| 10,813,383 | B2 | 10/2020 | Mua et al. |
| 2006/0225751 | A1 | 10/2006 | Koga et al. |
| 2006/0280840 | A1 | 12/2006 | Robertson |
| 2008/0268095 | A1 | 10/2008 | Herzog |
| 2009/0317530 | A1 | 12/2009 | Rotem et al. |
| 2011/0020501 | A1 | 1/2011 | Verbiest et al. |
| 2011/0245158 | A1 | 10/2011 | Scheele |
| 2012/0037175 | A1 | 2/2012 | Cantrell et al. |
| 2012/0064058 | A1 | 3/2012 | Cavallo et al. |
| 2012/0152265 | A1 | 6/2012 | Dube et al. |
| 2012/0192880 | A1 | 8/2012 | Dube et al. |
| 2012/0291305 | A1 | 11/2012 | Fu et al. |
| 2012/0291793 | A1* | 11/2012 | Byrd ...................... A24D 3/14 526/89 |
| 2012/0301599 | A1 | 11/2012 | Hoijer et al. |
| 2013/0046018 | A1 | 2/2013 | Romero et al. |
| 2014/0190500 | A1* | 7/2014 | Duan ..................... B01D 61/18 131/298 |
| 2014/0271951 | A1 | 9/2014 | Mua et al. |
| 2014/0271952 | A1 | 9/2014 | Mua et al. |
| 2014/0343254 | A1 | 11/2014 | Gerardi et al. |
| 2017/0215472 | A1 | 8/2017 | Dube et al. |

FOREIGN PATENT DOCUMENTS

| | | | |
|---|---|---|---|
| CN | 106333380 A | * 1/2017 | |
| WO | WO-9858555 A1 | * 12/1998 | ............. A24B 15/18 |
| WO | WO 2012/079094 | 6/2012 | |

OTHER PUBLICATIONS

Anonymous, "Tobacco drying in Microwave," Pipe Tobacco Discussion; Pipe Smokers Forums; Jan. 1, 2016; http://pipesmagazine.com/forums/topic/tobacco-drying-in-microwave; Retrieved from the Internet Sep. 13, 2018.

Anonymous, "Best Ways to Dry Tobacco Fast," Snuffhouse, Oct. 1, 2012; http://snuffhouse.com/discussion/837/best-ways-to-dry-tobacco-fast; Retrieved from the Internet Sep. 13, 2018.

Adamiec, "Microencapsulation of Peppermint Oil During Spray-Drying," Oct. 5, 2016; http://impascience.eu/bioencapsulation/340_contribution_texts/2006-10-05_P4-0.pdf ; Retrieved from the Internet Sep. 14, 2018.

Chakraborty et al., "Effect of the Novel Radiant Zone Drying Method on Anthocyanins and Phenolics of Three Blueberry Liquids," *J. Agric. Food Chem.*, 2010, vol. 58, pp. 324-330.

Durance, "Radiant Energy Vacuum Drying," Retrieved from the Internet on May 16, 2018: https://umanitoba.ca/centres/reffn/media/EnWaveWinnipeg.June_2014.pdf, pp. 1, 4, 6, 16.

(Continued)

*Primary Examiner* — Cynthia Szewczyk
(74) *Attorney, Agent, or Firm* — Womble Bond Dickinson (US) LLP

(57) ABSTRACT

A method of modifying the moisture level of (e.g., dehydrating) a tobacco plant or portion thereof, a tobacco-derived material, a tobacco product, or a tobacco additive is provided herein. The methods of dehydration disclosed herein can provide various benefits relative to traditional drying techniques, including providing retention of various beneficial components present in green tobacco (e.g., organoleptic compounds and proteins). Smoking articles and other tobacco products including such dehydrated tobacco materials are also provided.

6 Claims, 2 Drawing Sheets

(56) References Cited

OTHER PUBLICATIONS

Graziani et al., "Dehydration, Water Fluxes, and Permeability of Tobacco Leaf Tissue," *Plant Physiol.* 1971, vol. 48, pp. 575-579.

Hirun et al., "Investigating the Commercial Microwave Vacuum Drying Conditions on Physicochemical Properties and Radical Scavenging Ability of Thai Green Tea," *Drying Technology,* 2014, vol. 32, pp. 47-54.

Kumar et al. "Intermittent Drying of Food Products: A Critical Review," *J. Food Engineering,* 2014, vol. 121, pp. 48-57.

Kung et al., "Tobacco as a Potential Food Source and Smoke Material: Nutritional Evaluation of Tobacco Leaf Protein," *J. Food Science,* 1980, vol. 45, pp. 320-322.

Pawar et al., "Fundamentals of Infrared Heating and Its Application in Drying of Food Materials: A Review," *Journal of Food Process Engineering,* 2017, vol. 40, No. 1, pp. 1-15.

Potty, "Food Technology: Radiant Zone Drying-Innovation in Dryer Design," *Food Technology,* Retrieved from the Internet on May 15, 2018: http://vhpotty.blogspot.nl/2010/02/radiant-zone-drying-innovation-in-diver.html.

Minjares-Fuentes et al., "Effect of Different Drying Procedures on Physicochemical Properties and Flow Behavior of Aloe Vera (*Aloe barbadensis* Miller) Gel," *LTW-Food Science and Technology,* 2016, vol. 74, pp. 378-386.

Sheen, "Comparison of Chemical and Functional Properties of Soluble Leaf Proteins From Four Plant Species," *J. Agric. Food Chem.* 1991, vol. 39, pp. 681-685.

Soud, "Effect of Variables on The Pineapple Powder Production Using Microwave Spray Dryer," May 1, 2011; http://eprints.utm.my/id/eprint/32829/1/SoudAliSoudMFKK2011.pdf; Retrieved from the Internet Sep. 14, 2014.

Vega-Mercado et al., "Advances in Dehydration of Foods," *Journal of Food Engineering,* 2001, vol. 49, pp. 271-289; https://ucanr.edu/datastoreFiles/608-215.pdf.

Wang et al., "Comparison of Three New Drying Methods for Drying Characteristics and Quality of Shitake Mushroom (*Lentinus edodes*)," *Drying Technology,* 2014, vol. 32, No. 15, pp. 1791-1802.

Wikipedia: "Light," Retrieved from the Internet on May 15, 2018: https //en.wikipedia.org/wiki/Light.

\* cited by examiner

DEHYDRATION OF TOBACCO AND TOBACCO-DERIVED MATERIALS

CROSS-REFERENCE TO RELATED APPLICATIONS

The present application is a divisional of U.S. application Ser. No. 15/375,695 filed Dec. 12, 2016, the disclosure of which is incorporated by reference herein in its entirety.

FIELD OF THE INVENTION

The present invention relates to plants and modifications to the method of growing, harvesting, and/or treating plants (e.g., tobacco). Particularly, the present invention relates to products made or derived from tobacco, or that otherwise incorporate tobacco, and are intended for human consumption.

BACKGROUND OF THE INVENTION

Popular smoking articles, such as cigarettes, have a substantially cylindrical rod shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. Various types of smokeless tobacco products are known. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; 2010/0291245 to Gao et al; and 2011/0139164 to Mua et al.; PCT WO 04/095959 to Arnarp et al. and WO 2010/132444 to Atchley; each of which is incorporated herein by reference.

Smokeless tobacco products are available in various forms, including, but not limited to, moist snuff, dry snuff, snus, chewing tobacco, plug tobacco, twist tobacco, and dissolvables. Representative types of moist snuff products and "snus" products have been manufactured in Europe, particularly in Sweden, by or through companies such as Swedish Match AB, Fiedler & Lundgren AB, Gustavus AB, Skandinavisk Tobakskompagni A/S, and Rocker Production AB. Snus products available in the U.S.A. have been marketed under the tradenames Camel Snus Frost, Camel Snus Original and Camel Snus Spice by R. J. Reynolds Tobacco Company. See also, for example, Bryzgalov et al., 1N1800 Life Cycle Assessment, Comparative Life Cycle Assessment of General Loose and Portion Snus (2005). In addition, certain quality standards associated with snus manufacture have been assembled as a so-called GothiaTek standard.

Representative smokeless tobacco products also have been marketed under the tradenames Oliver Twist by House of Oliver Twist A/S; Copenhagen, Skoal, SkoalDry, Rooster, Red Seal, Husky, and Revel by U.S. Smokeless Tobacco Co.; "taboka" by Philip Morris USA; Levi Garrett, Peachy, Taylor's Pride, Kodiak, Hawken Wintergreen, Grizzly, Dental, Kentucky King, and Mammoth Cave by Conwood Company, LLC; and Camel Orbs, Camel Sticks, and Camel Strips by R. J. Reynolds Tobacco Company.

Through the years, various treatment methods and additives have been proposed for altering the overall character or nature of tobacco materials utilized in tobacco products. For example, additives or treatment processes have been utilized in order to alter the chemistry or sensory properties of the tobacco material, or in the case of smokable tobacco materials, to alter the chemistry or sensory properties of mainstream smoke generated by smoking articles including the tobacco material. Various types of enzymes, bacteria, and microorganisms (e.g., fungi and yeast) have been employed in conjunction with tobacco for the purpose of altering the chemical makeup of the tobacco, e.g., by reducing the content of certain chemical compounds. See, for example, U.S. Pat. No. 3,132,651 to Keifer; U.S. Pat. No. 3,513,857 to Silberman; U.S. Pat. No. 3,240,214 to Bayley; U.S. Pat. No. 3,636,097 to Harvey; U.S. Pat. No. 3,612,065 to Rosen; U.S. Pat. No. 3,943,945 to Rosen; U.S. Pat. No. 4,135,521 to Malan; U.S. Pat. No. 4,140,136 to Geiss et al.; U.S. Pat. No. 4,151,848 to Newton et al.; U.S. Pat. No. 4,307,733 to Teng; U.S. Pat. No. 4,308,877 to Mattina et al.; U.S. Pat. No. 4,407,307 to Gaisch; U.S. Pat. No. 4,476,881 to Gravely et al.; U.S. Pat. No. 4,556,073 to Gravely et al.; U.S. Pat. No. 4,557,280 to Gravely et al.; U.S. Pat. No. 4,566,469 to Semp et al.; U.S. Pat. No. 4,572,219 to Gaisch; U.S. Pat. No. 4,709,710 to Gaisch; U.S. Pat. No. 4,716,911 to Poulose; U.S. Pat. No. 4,887,618 to Bernasek; U.S. Pat. No. 4,941,484 to Clapp; U.S. Pat. No. 5,099,862 to White; U.S. Pat. No. 5,343,879 to Teague; U.S. Pat. No. 5,372,149 to Roth et al.; U.S. Pat. No. 5,601,097 to DeGranpreet; U.S. Pat. No. 7,549,425 to Koga et al.; U.S. Pat. No. 7,549,426 to Koga et al.; and U.S. Pat. No. 7,556,046 to Koga et al.; Int. Appl. Publ. No. WO 2000/02464 to Kierulff; and EP Appl. No. 1094724 to Kierulff, which are all incorporated herein by reference.

It would be desirable in the art to provide further methods for altering the character and nature of a plant such as a tobacco plant, as well as tobacco compositions and formulations useful in smoking articles or smokeless tobacco products.

SUMMARY OF THE INVENTION

The present invention provides a method of treating a tobacco plant or portion thereof, a tobacco-derived material, a tobacco product, or a tobacco additive to remove at least a portion of the water therefrom.

One aspect of the present disclosure provides a method of removing at least about 20% of the water from a green tobacco plant or portion thereof, comprising using light energy or microwave energy, optionally in combination with vacuum pressure, wherein the dehydrated tobacco plant material retains at least about 60% of the proteins present in the green tobacco plant or portion thereof. In some embodiments, at least about 40% of the water is removed from the green tobacco plant or portion thereof. In some embodiments, the dehydrated tobacco plant material retains at least about 70% of the proteins present in the green tobacco plant or portion thereof. The green tobacco plant or portion thereof and the dehydrated tobacco plant material, in certain embodiments, exhibit similar aroma characteristics.

In a further aspect of the disclosure, a method of providing a protein-enriched material is provided, the method comprising: removing water from a green tobacco plant or portion thereof (e.g., according to the method referenced herein above) to give a dehydrated tobacco plant material; contacting the dehydrated plant material with a solvent for a time and under conditions sufficient to extract one or more proteins from the plant material into the solvent and form a liquid protein-containing extract; separating a solid extracted plant material from the liquid protein-containing extract; and treating the liquid protein-containing extract so as to provide a protein-enriched material, wherein the amount of protein-enriched material obtained from a given amount of dehydrated plant material is at least about 50% that of protein enriched material obtained from the same amount of green plant material by dry weight. The method may, in certain embodiments, further comprise storing the dehydrated tobacco plant material for at least about 1 week prior to the contacting step.

In certain embodiments, the protein-enriched material comprises at least about 50% protein by dry weight or at least about 60% protein by dry weight. The disclosed method can, in some embodiments, further comprise the step of clarifying the liquid protein-containing extract prior to said treating step. The treating step referenced herein above, in some embodiments, comprises adjusting the pH of the liquid protein-containing extract to a pH of less than about 6 to form an acidic extract; isolating a precipitate from the acidic extract; and washing the precipitate to provide a protein-enriched material. In other embodiments, the treating step comprises filtering the liquid protein-containing extract on a ceramic filter or an ultrafiltration membrane to give a retentate and a liquid permeate; and washing the retentate to provide the protein-enriched material.

In another aspect, the present disclosure provides a protein-enriched material prepared according to the methods described herein. Such materials can be useful in various types of products and, as such, the disclosure further provides products e.g., including, but not limited to, dietary supplement, food, beverage, personal care item, pharmaceutical product, or pet food comprising the protein-enriched material.

In a further aspect, the present application provides a method of removing at least about 20% by weight of the water from a tobacco product, comprising using light energy or microwave energy, optionally in combination with vacuum pressure, wherein the dehydrated tobacco product retains at least about 80% by dry weight of the organoleptic compounds in the tobacco product. The specific organoleptic compounds can vary and, in certain embodiments, such organoleptic compounds comprise one or more of citronellol, geraniol, and methyl salicylate. The specific type of tobacco material in some embodiments is snuff. The present disclosure additionally, in some embodiments, provides a dehydrated tobacco product prepared according to the methods referenced herein.

In a still further aspect, the application provides a method of providing one or more liquid flavorings in solid form, comprising using light energy or microwave energy, optionally in combination with vacuum pressure, in the presence of a matrix material, to remove at least about 20% by weight of the water from the flavoring and to give a flavoring in solid form, wherein the flavoring in solid form retains at least about 80% by dry weight of the organoleptic compounds in the liquid flavorings. The specific liquid flavoring is not particularly limited and, in some embodiments, the liquid flavoring comprises menthol. The matrix material can vary. In some embodiments, the matrix material comprises a non-allergenic matrix. In some embodiments, the matrix material comprises a material selected from the group consisting of maltodextrin, corn flour, and combinations thereof. In further embodiments, the disclosure provides a solid flavoring prepared according to the methods disclosed herein. Additionally, in some aspects, the disclosure provides a tobacco product in the form of a cigarette or a smokeless tobacco product comprising a solid flavoring according to the methods provided herein.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1:
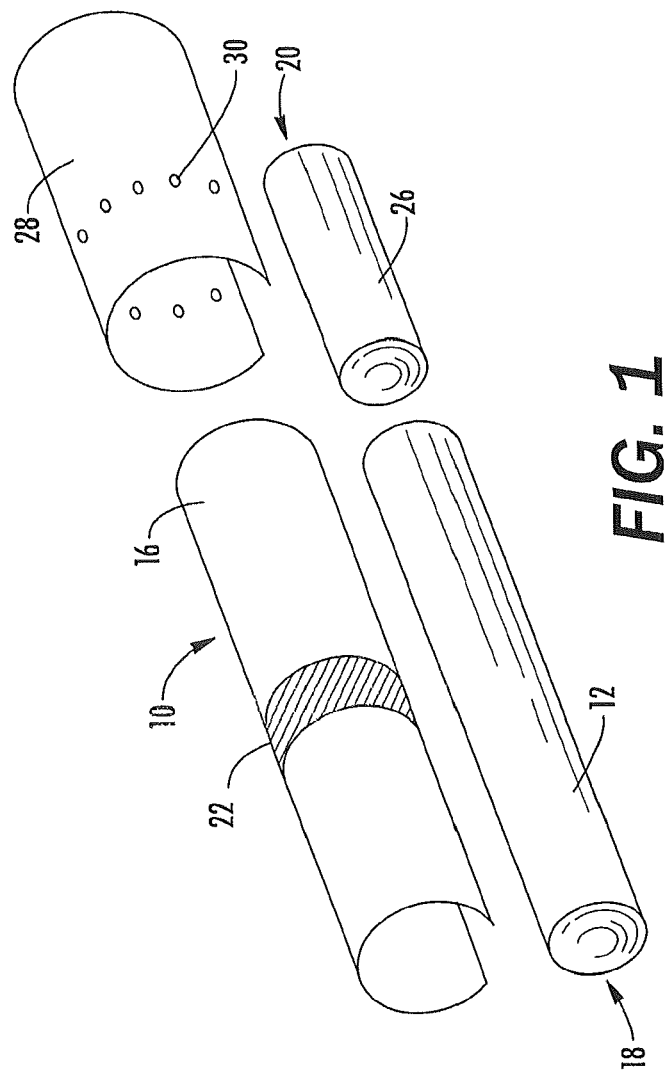
FIG. 1 is an exploded perspective view of a smoking article having the form of a cigarette, showing the smokable material, the wrapping material components, and the filter element of the cigarette.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The invention provides tobacco plants, plant components, and plant materials having modified levels of water. Particularly, the invention provides tobacco plants, plant components, and plant materials having reduced levels of water (i.e., plants, plant components, and plant materials in dehydrated form). The invention additionally provides products incorporating such plants, plant components, and plant materials into various products. The invention further provides various methods for these dehydration and incorporation methods. In another aspect, the invention provides for the dehydration of tobacco-containing materials (e.g., including, but not limited to, smokeless tobacco products such as moist snuff) and accordingly provides dehydrated tobacco-containing materials.

Dehydration as used herein is intended to refer to the removal of at least a portion of the water from a given material. Dehydration of a material can have varying beneficial effects on the material, including but not limited to, providing an alternative form of tobacco plants and portions thereof, tobacco-derived materials, tobacco products, and tobacco additives, while retaining desirable flavor and aroma characteristics, maintaining or enhancing the content of certain components therein, and/or stabilizing one or more components therein. In certain embodiments, dehydration can be conducted as an alternative to freeze drying and/or spray drying methods, which can result in the destruction and/or loss of components that are beneficially maintained in the dried material. According to the present disclosure, dehydration is applicable to a wide range of materials as will be described in detail further herein, e.g., 1) tobacco plants and portions thereof, 2) tobacco-derived materials (e.g., tobacco extracts), 3) tobacco products (e.g., snuff), and 4) other materials for incorporation within tobacco products (e.g., flavorings). Descriptions of each of these applications follow in greater detail below.

In a first aspect, the present invention provides for the dehydration of tobacco plants or portions thereof and, in particular, of harvested plants or portions thereof, to provide dehydrated tobacco plant material. Plants or portions thereof can, in certain embodiments, advantageously be harvested and directly subjected to dehydration (e.g., within a given period of time after harvest). Accordingly, plants and portions thereof that are subjected to dehydration according to the present invention are typically in "green" form. For example, in certain embodiments, dehydration is conducted within 10 days of harvesting, within 5 days of harvesting, within 3 days of harvesting, within 2 days of harvesting, within 1 day of harvesting, or within 12 hours of harvesting the tobacco plants. It is noted that, in some embodiments, conditions of storage between harvesting and dehydration can affect this period of time. For example, low temperatures (e.g., refrigeration) can extend the period of time after harvest within which dehydration is advantageously conducted (e.g., to avoid significant dehydration of proteins). As such, in some specific embodiments, harvested tobacco may be stored at room temperature for around 24 hours or less before dehydration processing and may be stored under refrigeration conditions for around 2 weeks or less before dehydration processing.

In some embodiments, the time at which tobacco is harvested to be subjected to the disclosed dehydration process is indicated in terms of "days post transplant," i.e., the growth time period following the planting of seedlings. Exemplary periods at which tobacco is advantageously harvested include, but are not limited to, at least about 50 days post-transplant, e.g., 60-72 days post-transplant (after which time degradation of the protein (RuBisCO, F1 protein) in the harvested tobacco is significant).

Dehydration of a tobacco plant or portion thereof can, in some embodiments, provide the plant or portion thereof in a form that is more conducive to storage. For example, in some embodiments, dehydration may preserve the quality and/or amount of certain components of the tobacco plant or portion thereof when it is stored for a period of time, relative to an untreated tobacco plant or portion thereof that is stored under the same conditions. Dehydration may, in some embodiments, preserve various attributes of the tobacco plant or portion thereof that are not typically preserved (or are preserved to a much lesser extent) when tobacco plants or portions thereof are directly stored, i.e., without undergoing dehydration prior to storage. Exemplary components that can be preserved to a greater extent in tobacco plants or portions thereof that have been dehydrated prior to storage include, but are not limited to, antioxidants, proteins, sugars, compounds providing desirable sensory characteristics, and the like. Advantageously, in certain embodiments, dehydration of tobacco plants or portions thereof according to the methods described herein can provide dried tobacco material wherein beneficial flavors and/or aromas are retained to a significant degree.

In one particular embodiment, certain proteins that are present in tobacco plants are retained in higher concentrations when the green plants are dehydrated and stored. One such protein is ribulose-1,5-bisphosphate carboxylase oxygenase (RuBisCO), a protein whose subunit molecular weight is about 550 kD (commonly referred to as a "Fraction 1 protein" or "F1 protein"). RuBisCO may comprise up to about 25% of the total protein content of a leaf and up to about 10% of the solid matter of a leaf. RuBisCO is largely considered to be the most abundant protein in the world, as it is present in every plant that undergoes photosynthesis. RuBisCO is essential to the initial step of the photosynthetic fixation of carbon dioxide and functions to catalyze the carboxylation and/or oxygenation of ribulose-1,5-bisphosphate. RuBisCO has been found to exhibit good nutritional properties and is colorless, tasteless, and odorless. Further, certain physical properties of RuBisCO render it advantageous for use in such products, as it has excellent binding, gelling, solubility, and emulsifying behavior. Accordingly, it is advantageous in certain embodiments to maximize the amount of RuBisCO in tobacco material, even after extended storage.

Another exemplary protein material that can be desirably retained in tobacco plants or portions thereof after dehydration and storage is a mixture of proteins commonly referred to as "Fraction 2 protein" or "F2 protein." F2 proteins generally comprise a mixture of proteins and peptides with molecular weights ranging from about 3 kD to about 100 kD and may also contain other compounds including sugars, vitamins, alkaloids, flavors, and amino acids.

Dehydration and storage may be advantageous in preserving proteins and other components to allow for extraction of such components from the dehydrated plants or portions thereof at a later time. Consequently, in one embodiment is provided a method comprising dehydrating tobacco plants or portions thereof, storing the plants or portions thereof, and later subjecting the stored plants or portions thereof to extraction. The plants can be stored indefinitely; however, it may be desirable in certain embodiments to store plants for up to about 1 year, up to about 6 months, up to about 3 months, up to about 2 months, or up to about 1 month (e.g., during which time minimal protein reduction can, in certain embodiments, occur, as will be described in further detail herein). Particularly exemplary extraction techniques that can be used in combination with the dehydration processes described herein are methods for the isolation of protein-containing and/or sugar-containing extracts from tobacco as described in US Pat. App. Pub. No. 2014/0271951 and U.S. Pat. No. 9,301,544, both to Mua et al., which are incorporated herein by reference.

Consequently, in certain embodiments, a protein-enriched tobacco material is obtained from dehydrated plants or portions thereof. The presently disclosed dehydration method for tobacco plants or portions thereof makes it possible, in certain embodiments, to store the dehydrated tobacco plants or portions thereof for a period of time before extracting proteins therefrom. In certain embodiments of the present invention, storage of dehydrated green tobacco and later extraction thereof can provide proteins in significant quantities. For example, as compared with direct extraction methods (i.e., where tobacco is harvested and directly subjected to extraction as described in US Pat. App. Pub. No. 2014/0271951 and U.S. Pat. No. 9,301,544), the presently disclosed method (where tobacco plants are harvested, dehydrated, stored, and later extracted) can provide for the extraction of at least about 50% as much protein, at least about 60% as much protein, at least about 70% as much protein, at least about 80% as much protein, at least about 90% as much protein, or a comparable amount of protein (~100% as much protein).

In a second aspect, the present invention provides for the dehydration of tobacco-derived materials. In such aspects, a tobacco-derived material is prepared and then can be subjected to one or more dehydration processes. For example, tobacco can be harvested, processed to provide an extract or isolate therefrom and the extract or isolate can then be subjected to dehydration as provided herein. In certain embodiments, dehydration of tobacco-derived materials, such as extracts, can result in longer shelf life thereof. In some embodiments, dehydration of tobacco-derived materials, such as extracts, may provide for materials with decreased bacteria content as compared with tobacco-derived materials that are directly stored (without undergoing dehydration prior to storage). It may be possible, in some embodiments, to provide extracts in solid form according to such methods. For example, in certain embodiments, a tobacco-derived extract can be dehydrated and, optionally, associated with a solid matrix material. For example, the matrix can comprise such materials as maltodextrin, corn flour, wheat flour, and the like. In preferred embodiments, the matrix is a non-allergenic matrix.

In a third aspect, the present invention provides for the dehydration of tobacco products. One exemplary tobacco product that may particularly benefit from the methods described herein is snuff, which is a smokeless tobacco product made from cut or ground tobacco leaves. Snuff includes both fine cut and long cut snuffs (cut tobacco) and snuff cut (ground tobacco). Some snuff traditionally is sold in moist form, with a considerable amount of associated water. By providing snuff in a dehydrated form according to the present disclosure, the consumer can add water in the desired amount to produce a moister material. Further, dehydrating snuff can, in some embodiments, increase its shelf life. The methods described herein advantageously can provide dehydrated snuff which preserves a significant amount of the aromas and flavors associated with the untreated snuff. Exemplary organoleptic compounds that are desirably retained in the dehydrated products include, but are not limited to, methyl salicylate, citronellol, geraniol, ethyl salicylate, flavonoids, anthocyanins, phenolics, and mint (e.g., peppermint) oils. In some embodiments, the overall amount of such compounds (organoleptic compounds generally) in the final dehydrated product can be at least about 50%, at least about 60%, at least about 70%, at least about 80%, at least about 90%, or at least about 95% by dry weight as compared with the original (non-dehydrated) material. In some embodiments, the amount of any one or more organoleptic compounds (e.g., of the specifically disclosed compounds) in the final dehydrated product can be at least about 50%, at least about 60%, at least about 70%, at least about 80%, at least about 90%, or at least about 95% by dry weight as compared with the original (non-dehydrated) material (e.g., about 50-100% retention of the one or more organoleptic compounds). For example, in one particular embodiment, the amount of citronellol in the final dehydrated product can be at least about the given percentages of the amount of citronellol in the original (non-dehydrated) material. In another embodiment, the amount of geraniol in the final dehydrated product is at least about the given percentages of the amount of geraniol in the original (non-dehydrated) material. In a further particular embodiment, the amount of methyl salicylate in the final dehydrated product is at least about the given percentages of the amount of methyl salicylate in the original (non-dehydrated) material. In still further embodiments, the combined amount of two or more of these (e.g., geraniol and methyl salicylate; geraniol and citronellol; methyl salicylate and citronellol; or geraniol, methyl salicylate, and citronellol) is at least about the given percentages of the amount of the respective combination in the original (non-dehydrated) material.

In a fourth aspect, the present invention provides dehydration methods for the preparation of additives for incorporation, e.g., within various tobacco products. For example, in certain embodiments, flavorings can be dehydrated and associated with a matrix to provide the flavorings in solid form. In an exemplary embodiment, a flavorant can be subjected to dehydration to remove the liquid component and a matrix material can be used to entrap the resulting flavor therein. The types of flavorings to which this technique can be applied can vary and include menthol, mint (e.g., peppermint, spearmint), wintergreen, methyl salicylate, cinnamon, vanillin, licorice, and combinations of any two or more of the foregoing. The matrix with which the flavor can be associated can vary and may be any material allowing for the passive release of flavor therefrom. For example, the matrix can comprise such materials as maltodextrin, corn flour, wheat flour, and the like. In preferred embodiments, the matrix is a non-allergenic matrix.

Generally, the degree to which a material is dehydrated according to the present disclosure can vary. A material comprises less water after undergoing dehydration than prior to dehydration; however, there is typically some water associated with a dehydrated material. According to the methods described herein, the dehydrated material (e.g., tobacco plant or portions thereof, tobacco-derived material, tobacco product, or additive) can be dehydrated such that it comprises less than about 50% water by weight, less than about 40% water by weight, less than about 30% water by weight, less than about 20% water by weight, less than about 15% water by weight, less than about 10% water by weight, less than about 5% water by weight, less than about 2% water by weight, less than about 1% water by weight, or less than about 0.5% water by weight. Preferably, tobacco plants or portions thereof can be dehydrated to about 5% to about 30% water by weight, e.g., about 10% to about 20% or about 10% to about 15% water by weight. Preferably, tobacco-derived materials (e.g., extracts) can be dehydrated to less than about 25%, e.g., about 3% to about 25%; tobacco products (e.g., snuff) can be dehydrated to less than about 35%, e.g., about 4% to about 35%; and additives (e.g., flavorings) can be dehydrated to less than about 25%, e.g., about 2% to about 25% moisture.

The methods used for dehydration can vary and may comprise any methods of dehydration known in the art. In some embodiments, conventional dryer systems can be employed for the dehydration. Exemplary industrial types of dryers that may be employed for dehydration according to the present disclosure include, but are not limited to, fluid bed dryers, tray dryers, belt dryers, vacuum tray dryers, spray dryers, and rotary dryers. For example, dryers that are used for drying organic products such as foodstuffs, food related products, nutritional supplements, and pharmaceuticals may be used or modified for use in drying tobacco plants or portions thereof, tobacco-derived material, tobacco products, and additives according to the present disclosure.

Advantageously, mild conditions for dehydration are employed to preserve flavors and/or aromas associated with the materials to be dehydrated as described herein. In certain embodiments, it may be advantageous to conduct the dehydration at a low temperature, as higher temperatures may cause the degradation of certain beneficial components present in the materials. For example, in some embodiments, the temperature at which dehydration is conducted is at or below ambient temperature. In certain embodiments, the dehydration process comprises heating the plant or portions thereof at elevated temperature. The temperature can range, from about room temperature to about 200° C. Where used, the heat can be provided via convection, conduction, radiation (e.g., ultrasound, infrared, or microwave radiation), and/or electromagnetic field, and can be intermittent or continuous and adiabatic or non-adiabatic. The drying medium in convection mode can be air, superheated steam, or/or other gases. The relative motion of the drying medium and the material to be dried (i.e., tobacco plant, material, product, or additive) can be concurrent, counter current, or mixed flow. The material to be dried can be stationary during the drying process or can be in motion (e.g., agitated and/or dispersed). In certain embodiments, the dehydration system can be at atmospheric pressure and, in other embodiments, the dehydration process comprises subjecting the material to decreased pressure (e.g., by applying vacuum thereto). These techniques can be employed alone or in combination. The time required to effectuate the desired dehydration can vary, depending upon the material being dried, the system employed for dehydration, and the desired moisture content of the final product. The mode of operation of drying/dehydrating systems can be batch or continuous.

One representative means for dehydrating materials as described herein is the PowderPure process (Columbia PhytoTechnology, OR, USA), disclosed in U.S. Pat. No. 6,539,645 to Savarese, which is incorporated herein by reference. As described therein, dry radiant heat (in the form of light energy within a given wavelength range) is passed through a support surface on which a material to be dried is applied, such that the radiant heat is absorbed by the material to be dried. This method targets only water molecules, leaving various other components of the material (e.g., desirable flavor components and beneficial proteins) undisturbed. The temperature employed by the method can vary and, in certain embodiments, the treatment temperature is between about room temperature and about 100° C. Typically, the system employs temperatures at the upper end of this range only for a limited period of time (e.g., using a temperature of 100° C. for a few minutes, and then decreasing the temperature to room temperature for the remainder of the process). In certain embodiments, this type of system operates at atmospheric pressure. The moisture content of various materials using this type of system in certain embodiments can be reduced to as little as 3% by weight and below. Advantageously, this process is a continuous, scalable process and, in preferred embodiments, can successfully retain one or more of color, aroma, flavor, and nutrients contained in the material following the drying process. In certain embodiments, such dry radiant heat drying techniques may be particularly applicable for the dehydration of green tobacco plants and portions thereof and for the dehydration of tobacco products (e.g., moist snuff).

Another representative means for dehydrating materials as described herein uses a combination of vacuum pressure and microwave energy. Although not limited thereto, such drying systems typically employ relatively low drying temperatures. For example, the treatment temperature can be between about room temperature and about 60° C. Again, in preferred embodiments, such a process can successfully retain one or more of color, aroma, flavor, and nutrients contained in the material following the drying process. Such processes may, in some embodiments, introduce new product attributes, such as puffing. For example, Enwave Corporation's Radiant Energy Vacuum ("REV™") platforms can be utilized (Canada). In one embodiment, Enwave's nutraREV™ or quantaREV™ platform is employed, as these platforms can provide for continuous processing, flexible final moisture content, and high-speed processing (minutes or hours). Other commercial suppliers of vacuum/microwave drying units that can be employed in embodiments as described herein include, but are not limited to, Microwave Vacuum Drying Systems from TechniProcess (France) and new technology Microwave vacuum drying from Merk Process (Germany). In certain embodiments, such vacuum/microwave drying techniques may be particularly applicable for the dehydration of green tobacco plants and portions thereof and for the dehydration of flavorings.

A further representative means for dehydrating materials as described herein comprises a spray drying process by atomization. Although not limited thereto, such drying systems typically employ relatively low temperatures. In some such embodiments, this dehydration process can be accomplished at room temperature, which can be beneficial, e.g., in minimizing degradation of sensitive and volatile liquid ingredients. In certain embodiments, this type of system operates at atmospheric pressure. In certain embodiments, this method may find particular use in converting liquids to solid form (e.g., in dehydrating liquid tobacco extracts and in dehydrating flavoring and other additives to solid form). One exemplary system that functions in this manner is the DriZoom™ system from ZoomEssence (NJ, USA).

Other types of drying systems that can be utilized according to the present disclosure include, but are not limited to, vacuum osmotic dehydration units (e.g., from FPL Food, LLC (GA, USA)); heat pump food dehydrators (e.g., from Nyle Systems (ME, USA)), microwave intermittent drying systems, optionally employing convection or microwave heating (e.g., as described in Kumar et al., *J. Food Engineering* 121(1): 48-57 (2014)), atmospheric freeze drying systems (e.g., from Millrock Technology (NY, USA) and Martin Christ (Germany)), multistage drying systems, such as those combining fluidization and spray drying techniques (e.g., from GEA Process Engineering, Inc. (MD, USA)), Fluidized bed dryers (e.g., from Ventilex BV (Netherlands), Glatt GmbH (Germany), Sherwood Scientific, Ltd. (United Kingdom), and Kason Industries (GA, USA), and tray drying systems (e.g., from O'Hara Technologies (Canada)).

The rate at which the materials disclosed herein are dehydrated according to the present disclosure can vary. In some embodiments, the rate of dehydration can be modified to alter the makeup of the dehydrated material. Following dehydration, the dehydrated material is advantageously stored in an airtight container to ensure that a significant amount of water is not re-introduced into the dehydrated material.

Various processing can be done prior to or following the dehydration methods described herein. For example, tobacco plant or plant components can be treated with one or more enzymes or probiotics in various stages of the plant life cycle (e.g., in the form of a seed, a seedling, an immature live plant, a mature live plant, a harvested plant, or a portion of any of the above). See, for example, the disclosures of U.S. Patent Application Publication Nos. 2014/0020694 to Moldoveanu et al. and 2013/0269719 to Marshall, respectively, which are incorporated herein by reference. The tobacco materials described herein can, in some embodiments, be contacted with one or more other types of reagents, e.g., amino acids (e.g., lysine, glycine, histidine, alanine, methionine, glutamic acid, aspartic acid, proline, phenylalanine, valine, and arginine), compositions incorporating di- and/or trivalent cations, certain non-reducing saccharides, certain reducing agents, phenolic compounds (e.g., compounds having at least one phenolic functionality), certain compounds having at least one free thiol group or functionality, oxidizing agents (e.g., hydrogen peroxide or ozone), oxidation catalysts (e.g., titanium dioxide), natural plant extracts (e.g., rosemary extract), and combinations thereof.

Tobacco or tobaccos to which the methods provided herein are applicable can vary. In certain embodiments, tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Pasado, Cubano, Jatim and Bezuki tobaccos), light air cured (e.g., North Wisconsin and Galpao tobaccos), Indian air cured, Red Russian and *Rustica* tobaccos, as well as various other rare or specialty tobaccos and various blends of any of the foregoing tobaccos. Descriptions of various types of tobaccos, growing practices and harvesting practices are set forth in *Tobacco Production, Chemistry and Technology*, Davis et al. (Eds.) (1999), which is incorporated herein by reference. Various representative other types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and 2008/0245377 to Marshall et al.; each of which is incorporated herein by reference. Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia,* and *N. spegazzinii*.

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference. Most preferably, the tobacco materials are those that have been appropriately cured and aged. Especially preferred techniques and conditions for curing flue-cured tobacco are set forth in Nestor et al., Beitrage Tabakforsch. Int., 20 (2003) 467-475 and U.S. Pat. No. 6,895,974 to Peele, which are incorporated herein by reference. Representative techniques and conditions for air curing tobacco are set forth in Roton et al., Beitrage Tabakforsch. Int., 21 (2005) 305-320 and Staaf et al., Beitrage Tabakforsch. Int., 21 (2005) 321-330, which are incorporated herein by reference. Certain types of unusual or rare tobaccos can be sun cured. Manners and methods for improving the smoking quality of Oriental tobaccos are set forth in U.S. Pat. No. 7,025,066 to Lawson et al., which is incorporated herein by reference. Representative Oriental tobaccos include katerini, prelip, komotini, xanthi and yambol tobaccos. Tobacco compositions including dark air cured tobacco are set forth in US Patent Appl. Pub. No. 2008/0245377 to Marshall et al., which is incorporated herein by reference. See also, types of tobacco as set forth, for example, in US Patent Appl. Pub. No. 2011/0247640 to Beeson et al., which is incorporated herein by reference.

The *Nicotiana* species can be selected for the content of various compounds that are present therein. For example, in certain embodiments, plants of the *Nicotiana* species (e.g., *Galpao commun* tobacco) are specifically grown for their abundance of leaf surface compounds. In certain embodiments, plants of the *Nicotiana* species are specifically grown for their relatively low levels of certain undesired compounds (e.g., asparagine). Tobacco plants can be grown in greenhouses, growth chambers, or outdoors in fields, or grown hydroponically.

The whole tobacco plant, or certain parts or portions of the plant of the *Nicotiana* species can be employed as provided herein. For example, virtually all of the plant (e.g., the whole plant) can be used or parts or pieces of the plant can be harvested or separated for treatment after harvest. For example, the flower, leaves, stem, stalk, roots, seeds, and various combinations thereof, can be isolated for use or further treatment. Consequently, whole tobacco plants or separated portions thereof can be directly dehydrated, subjected to extraction techniques provide tobacco-derived materials (e.g., extracts) that can be dehydrated, or used in the production of tobacco products (e.g., snuff) that can be dehydrated. In certain embodiments, leaves are advantageously separated from the remainder of the plant and dehydrated, with or without the stems.

The post-harvest processing of the plant or portion thereof can vary. After harvest, a plant, or portion thereof, can be directly used in a green form (e.g., the plant or portion thereof can be used without being subjected to any curing process). For example, the plant or portion thereof can be dehydrated without being subjected to significant storage, handling or processing conditions. In certain situations, it is advantageous for the plant or portion thereof be used virtually immediately after harvest.

Although not particularly desirable, a plant or portion thereof in green form can be refrigerated or frozen for later processing (e.g., dehydration, extraction followed by dehydration, and/or preparation of a tobacco product followed by dehydration). The dehydration techniques described herein can optionally be combined with one or more further processing methods including, but not limited to, freeze drying, subjected the plant or portion thereof to irradiation, yellowing, drying, curing (e.g., using air drying techniques or techniques that employ application of heat), heating, or cooking (e.g., roasting, frying or boiling) the plant or portion thereof, or otherwise subjecting the plant or portion thereof to storage or treatment for later use. Further processing can be conducted on any of the materials described herein, e.g., irradiation, pasteurization, or other exposure to controlled heat treatment, detailed, for example, in US Pat. Pub. No. 2009/0025738 to Mua et al., which is incorporated herein by reference.

A harvested plant or portion thereof can be physically processed prior to use. In some embodiments, the plant or portion thereof can be separated into individual parts or pieces (e.g., the leaves can be removed from the stems, and/or the stems and leaves can be removed from the stalk) prior to dehydration. The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). In certain embodiments, the dehydrated tobacco plants or portions thereof can have the form of processed tobacco parts in essentially natural lamina and/or stem form. The manner by which the tobacco is provided in such forms can vary. The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent. Tobacco parts or pieces can be comminuted, ground or pulverized into a powder type of form using equipment and techniques for grinding, milling, or the like. Most preferably, the tobacco is relatively dry in form during grinding or milling, using equipment such as hammer mills, cutter heads, air control mills, or the like. For example, tobacco parts or pieces may be ground or milled when the moisture content thereof is less than about 15 weight percent to less than about 5 weight percent.

Tobacco (in any of the forms described herein, including but not limited to, green form, dehydrated form, cured form, etc.) can, in certain embodiments, be subsequently extracted. Various extraction techniques can be used. See, for example, the extraction processes described in US Pat. Appl. Pub. No. 2011/0247640 to Beeson et al., which is incorporated herein by reference. Other exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated by reference herein.

The dehydrated materials described herein (i.e., dehydrated tobacco plants or portions thereof, extracts derived from dehydrated tobacco (e.g., protein-enriched extracts), dehydrated tobacco-derived material (e.g., dehydrated tobacco extracts), or dehydrated additive (e.g., flavorings)) can be useful as materials for various compositions. For example, in some embodiments, the dehydrated materials described herein are incorporated within tobacco compositions, particularly tobacco compositions incorporated into smoking articles, smokeless tobacco products, and aerosol-generating devices. For example, a tobacco product can comprise dehydrated tobacco material and/or may incorporate tobacco that is combined with one or more of: extracts derived from dehydrated tobacco, dehydrated extracts, and/or dehydrated additives (e.g., flavorings). That is, a portion of the tobacco composition can be comprised of some form of dehydrated material prepared according to one or more embodiments of the present disclosure. Addition of dehydrated material or materials described herein to a tobacco composition can enhance a tobacco composition in a variety of ways, depending on the nature of the dehydrated material and the type of tobacco composition. For example, such materials can, in certain embodiments serve to provide flavor and/or aroma to a tobacco product (e.g., the materials can alter the sensory characteristics of tobacco compositions or smoke derived therefrom). Other materials (e.g., extracts of dehydrated tobacco and/or dehydrated extracts) can serve functional purposes within tobacco compositions, such as binder or filler functions. Certain materials described herein can serve as a replacement for one or more traditional components of a tobacco product.

Tobacco compositions comprising one or more of the dehydrated materials described herein (i.e., dehydrated tobacco, an extract derived from dehydrated tobacco (e.g., a protein-enriched extract), a dehydrated tobacco-derived material (e.g., a dehydrated tobacco extract), or a dehydrated additive (e.g., a flavoring)) can be incorporated within a tobacco product. The tobacco product to which the dehydrated materials of the present disclosure are added can vary, and may include any product configured or adapted to deliver tobacco or some component thereof to the user of the product. Exemplary tobacco products include smoking articles (e.g., cigarettes), smokeless tobacco products, and aerosol-generating devices that contain nicotine and/or a tobacco material or other plant material that is not combusted during use.

Accordingly, dehydrated materials provided herein can, in some embodiments, be used as compositions in the manufacture of smoking articles. For example, compositions prepared in accordance with the present invention can be mixed with casing materials and applied to tobacco as a casing ingredient or as a top dressing. Still further, compositions of the invention can be incorporated into a cigarette filter (e.g., in the filter plug, plug wrap, or tipping paper) or incorporated into cigarette wrapping paper, preferably on the inside surface, during the cigarette manufacturing process. See, for example, the description and references related to tobacco isolates used in smoking articles set forth in US Pat. Pub. No. 2012/0192880 to Dube et al., which is incorporated by reference herein. Representative tobacco blends, non-tobacco components, and representative cigarettes manufactured therefrom are also set forth in the Dube et al. reference noted above.

Referring to FIG. 1, there is shown a smoking article 10 in the form of a cigarette and possessing certain representative components of a smoking article that can contain the formulation of the present invention. The cigarette 10 includes a generally cylindrical rod 12 of a charge or roll of smokable filler material (e.g., about 0.3 to about 1.0 g of smokable filler material such as tobacco material) contained in a circumscribing wrapping material 16. The rod 12 is conventionally referred to as a "tobacco rod." The ends of the tobacco rod 12 are open to expose the smokable filler material. The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. The band 22 can be printed on the inner surface of the wrapping material (i.e., facing the smokable filler material), or less preferably, on the outer surface of the wrapping material.

At one end of the tobacco rod 12 is the lighting end 18, and at the mouth end 20 is positioned a filter element 26. The filter element 26 positioned adjacent one end of the tobacco rod 12 such that the filter element and tobacco rod are axially aligned in an end-to-end relationship, preferably abutting one another. Filter element 26 may have a generally cylindrical shape, and the diameter thereof may be essentially equal to the diameter of the tobacco rod. The ends of the filter element 26 permit the passage of air and smoke therethrough.

A ventilated or air diluted smoking article can be provided with an optional air dilution means, such as a series of perforations 30, each of which extend through the tipping material and plug wrap. The optional perforations 30 can be made by various techniques known to those of ordinary skill in the art, such as laser perforation techniques. Alternatively, so-called off-line air dilution techniques can be used (e.g., through the use of porous paper plug wrap and pre-perforated tipping paper). The formulations of the invention can be incorporated within any of the components of a smoking article, including but not limited to, as a component of the tobacco charge, as a component of the wrapping paper (e.g., included within the paper or coated on the interior or exterior of the paper), as an adhesive, as a filter element component, and/or within a capsule located in any region of the smoking article.

Compositions of the invention can also be incorporated into aerosol-generating devices that contain nicotine and/or tobacco material (or some portion or component thereof) that is not intended to be combusted during use, including so-called "e-cigarettes". Some of these types of smoking articles employ a combustible fuel source that is burned to provide an aerosol and/or to heat an aerosol-forming material. Others employ battery-powered heating elements to heat an aerosol-forming composition. Exemplary references that describe smoking articles of a type that generate flavored vapor, visible aerosol, or a mixture of flavored vapor and visible aerosol, include those set forth in US Pat. Pub. No. 2012/0192880 to Dube et al., which is incorporated by reference herein.

The formulations of the invention can be incorporated into smokeless tobacco products, such as loose moist snuff; snus; loose dry snuff; chewing tobacco; pelletized tobacco pieces; extruded or formed tobacco strips, pieces, rods, cylinders or sticks; finely divided ground powders; finely divided or milled agglomerates of powdered pieces and components; flake-like pieces; molded tobacco pieces; gums; rolls of tape-like films; readily water-dissolvable or water-dispersible films or strips; meltable compositions; lozenges; pastilles; or capsule-like materials possessing an outer shell and an inner region. Smokeless tobacco compositions of the invention can include a water-soluble polymeric binder material and optionally other ingredients that provide a dissolvable composition that will slowly disintegrate in the oral cavity during use. In certain embodiments, the smokeless tobacco composition can include lipid components that provide a meltable composition that melts (as opposed to merely dissolving) in the oral cavity, such as compositions set forth in US Pat. Pub. No. 2012/0037175 to Cantrell et al., which is incorporated by reference herein. Various types of smokeless tobacco products are described or referenced in US Pat. Pub. No 2012/0152265 to Dube et al., which is incorporated herein by reference.

Figure 2:
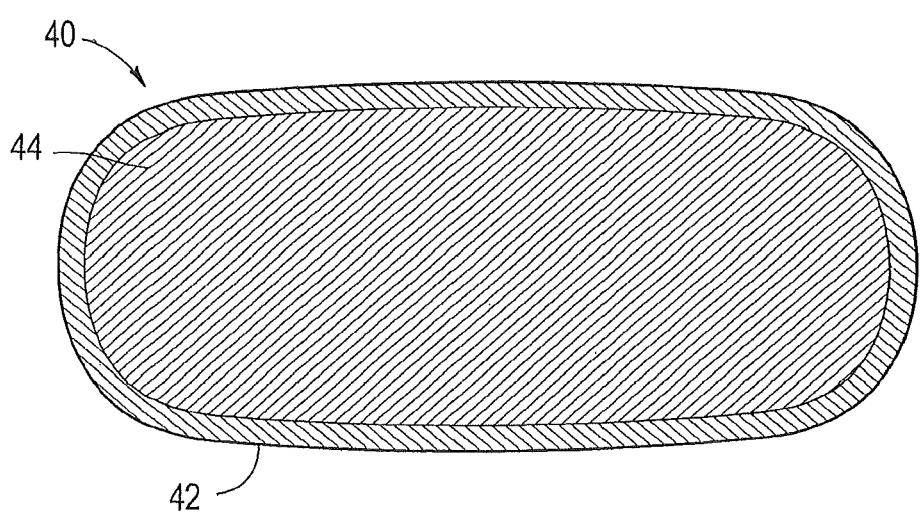
FIG. 2 is a cross-sectional view of a smokeless tobacco product embodiment, taken across the width of the product, showing an outer pouch filled with a smokeless tobacco composition of the invention.

Referring to FIG. 2, a representative snus type of tobacco product is shown. In particular, FIG. 4 illustrates a smokeless tobacco product 40 having a water-permeable outer pouch 42 containing a smokeless tobacco composition 44. Any of the components of the tobacco product can comprise a tobacco-derived material as described herein (e.g., the interior or exterior of the pouch lining or a portion of the smokeless tobacco composition contained therein). As described herein, such smokeless tobacco products can be dehydrated prior to packaging. According to the present disclosure, the dehydrated snus can optionally comprise one or more forms of dehydrated tobacco materials provided herein.

Further ingredients can be admixed with, or otherwise incorporated within, smokeless tobacco compositions according to the invention. The ingredients can be artificial, or can be obtained or derived from herbal or biological sources. Exemplary types of ingredients include salts (e.g., sodium chloride, potassium chloride, sodium citrate, potassium citrate, sodium acetate, potassium acetate, and the like), natural sweeteners (e.g., fructose, sucrose, glucose, maltose, vanillin, ethylvanillin glucoside, mannose, galactose, lactose, and the like), artificial sweeteners (e.g., sucralose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, manitol, xylitol, sorbitol, finely divided cellulose, and the like), binders (e.g., povidone, sodium carboxymethylcellulose and other modified cellulosic types of binders, sodium alginate, xanthan gum, starch-based binders, gum arabic, lecithin, and the like), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), colorants (e.g., dyes and pigments, including caramel coloring and titanium dioxide, and the like), humectants (e.g., glycerin, propylene glycol, and the like), effervescing materials such as certain acid/base combinations, oral care additives (e.g., thyme oil, eucalyptus oil, and zinc), preservatives (e.g., potassium sorbate, and the like), syrups (e.g., honey, high fructose corn syrup, and the like), disintegration aids (e.g., microcrystalline cellulose, croscarmellose sodium, crospovidone, sodium starch glycolate, pregelatinized corn starch, and the like), flavorant and flavoring mixtures, antioxidants, and mixtures thereof. Exemplary encapsulated additives are described, for example, in WO 2010/132444 to Atchley, which has been previously incorporated by reference herein. See also, the smokeless tobacco ingredients set forth in US Pat. Pub. Nos. 2012/0055494 to Hunt et al. and 2012/0199145 to Byrd et al., which are incorporated by reference herein.

The amount of dehydrated material as described herein incorporated within a tobacco composition or tobacco product can depend on the desired function of the material, the chemical makeup of the dehydrated material, and the type of tobacco composition to which the dehydrated material is added. The amount of dehydrated material added to a tobacco composition can vary, but will typically not exceed about 50 weight percent based on the total dry weight of the tobacco composition to which the composition is added. Although the use of dehydrated tobacco materials is generally described in the context of tobacco compositions, it is noted that such formulations can be applicable in many other types of compositions. For example, dehydrated tobacco materials of the invention can be used in foods or beverages or otherwise incorporated into a dietary supplement intended for oral consumption, such as dietary supplements as defined by the Dietary Supplement Health and Education Act of 1994 (DSHEA). Particularly, protein-enriched materials derived from dehydrated tobacco and/or dehydrated protein-enriched materials are useful in this regard, and can also be incorporated into foods designed specifically for animals (e.g., pet foods). Additional uses include cosmetic and pharmaceutical compositions.

Dietary supplements of the invention can take various forms, including powders, liquids, bars, and the like. Such supplements typically include additional components and excipients such as sweeteners, fillers, colorants, antioxidants, vitamins, minerals, and the like. Dehydrated materials of the invention could be used, for example, in the compositions and formulations set forth in US Pat. App. Pub. Nos. 2006/0280840 to Robertson; 2008/0268095 to Herzog; 2009/0317530 to Rotem et al.; 2011/0020501 to Verbiest et al.; 2011/0245158 to Scheele; 2012/0064058 to Cavallo et al.; 2012/0301599 to Hoijer et al.; and 2013/0046018 to Romero et al., all of which are incorporated by reference herein.

EXPERIMENTAL

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

Dehydration of Green Tobacco (Comparison of Various Methods)

Green tobacco leaves (with an average moisture content of about 80% by weight) are dehydrated using the PowderPure (Columbia PhytoTechnology) process at atmospheric pressure (based on the disclosure of U.S. Pat. No. 6,539,645, which is incorporated herein by reference), using a barn drying process, or using microwave/vacuum dehydration technologies, namely, nutraREV™ (Enwave Corporation) process, or quantaREV™ (Enwave Corporation). The PowderPure process involves pureeing whole leaves and dehydrating them in 10-20 minutes using far infrared frequency waves (from 85% to 4-6% moisture). The barn drying process involves curing green tobacco material in a flue-cured barn at 250° C. for 48 hours (as opposed to 7 days of curing typically conducted for cigarette tobacco). The nutraREV™ and quantaREV™ processes involve subjecting whole tobacco leaves (nutraREV™ and quantaREV™) and de-stemmed tobacco leaves (quantaREV) to microwave/vacuum drying to dehydrate them in about 10-20 minutes (from 80% to 4-6% moisture). These processes differ in that nutraREV™ involves drying via conveyance through a tunnel belt, whereas quantaREV™ involves drying in an enclosed rotatory cylindrical batch system.

The tobacco dehydrated using each of these processes is mature green flue-cured tobacco leaves harvested at 62-70 days post-transplant. The average moisture content prior to processing is about 80-85%, and the resulting dehydrated tobacco samples have an average moisture content of about 4-6% moisture by weight.

Samples of dehydrated and non-dehydrated tobaccos are submitted for physicochemical analysis, including a Bradford protein assay (to detect water soluble proteins, e.g., RuBisCO), total amino acid analysis (TAA), reduced SDS-PAGE (to evaluate RuBisCO's gel bands at 55 and 15 kDa), and native SDS-page (to determine if RuBisCO is still assembled/intact).

TABLE 1

Comparison of barn drying and PowderPure process

| Sample | F1 Protein Content (g/kg) | Calculated F1 Protein retention (%) | TAA (g/kg) |
|---|---|---|---|
| Fresh/frozen whole leaf (control) | 33.9 | — | 92.5 |
| Barn dried leaf | 10.9 | 32.2 | 157.7 |
| PowderPure dried leaf | 1.8 | 5.3 | 90.6 |

With regard to the barn dried leaf data, the increase in TAA with respect to the control is believed to be due to degradation of proteins in the tobacco under the elevated temperature (250° C.) used in this process (as further supported by native SDS PAGE results, in which no gel band was observed at 55 kDa for the barn dried leaf sample). A native SDS PAGE band at 55 kDa typically indicates that RuBisCO is still intact (which is important in maintaining the functional properties of this protein).

With regard to the PowderPure dried leaf data, the comparable TAA value but significantly lower F1 protein content value suggests that the Powder Pure sample may have depolymerized the F1 protein significantly to polypeptide form (rather than to amino acid units). The reduced SDS PAGE results indicate a prominent gel band at 25 kDa and not at the typical 15 and 55 kDa bands indicative of RuBisCO. Native PAGE results show no prominent gel band at 55 kDa for this sample, again indicating that little to no intact RuBisCO is present). The results in Table 1 and, in particular, the low protein retention in the PowderPure sample could be due to significant loss of green juice due to thawing of frozen tobacco prior to dehydration of this sample.

TABLE 2

Evaluation of nutraREV ™

| Sample | F1 Protein Content (g/kg) | Calculated F1 Protein retention (%) | TAA (g/kg) |
|---|---|---|---|
| Fresh de-stemmed leaf (control) | 19.1 | — | 64.2 |
| nutraREV dried de-stemmed leaf | 16.8 | 87.9 | 72.0 |

Compared to the control de-stemmed sample, the nutraREV™ process retained a majority (87.9%) of the RuBisCO in the dried leaf. Similar TAA values as well as similar reduced SDS-PAGE and native-PAGE molecular weight data bands indicate that nutraREV™ does not significantly degrade protein into polypeptides or amino acids as found with the barn cured and PowderPure drying processes (see Table 1).

TABLE 3

Comparison of nutraREV and quantaREV

| Sample | F1 Protein Content (g/kg) | Calculated F1 Protein retention (%) | TAA (g/kg) |
|---|---|---|---|
| Fresh/frozen whole leaf (control) | 12.7 | — | — |
| nutraREV dried whole leaf | 10.0 | 78.7 | 67.5 |
| quantaREV dried whole leaf | 9.0 | 70.8 | 77.0 |

Compared to the control sample, the nutraREV™ and quantaREV™ processes retained good percentages (78.7% and 70.8% respectively) of the RuBisCO in the dried leaf. TAA values show a slightly higher increase for quantaREV than nutraREV™, which was supported by reduced SDS-PAGE and native SDS-PAGE analysis (wherein the quantaREV™ band intensities at 15 kDa molecular weight and higher are not as strong as those for nutraREV™). Freezing the leaves during shipment and thawing before further processing may have resulted in leaf with disrupted tissues, which could have led to protein breakdown prior to drying, especially for tobacco dried via quantaREV.

Example 2

Dehydration of Green Tobacco (Further Analysis)

Further studies were done using nutraREV™ (believed to be the most efficient of the processes in Example 1) and PowderPure (believed to be the most commercially viable of the processes in Example 1) to dehydrate mature green Burley tobacco (harvested 65 days post-transfer) on a pilot scale. The PowderPure process was used to dehydrate a portion of the tobacco as pureed leaf and a portion of the tobacco as whole leaf tobacco. The nutraREV™ process was used to dehydrate two portions of the tobacco: "Group A" (fresh looking leaves) and "Group B" (dark brown leaves showing evidence of decomposition).

The resultant leaf protein stability was monitored for 6 months under ambient and frozen storage conditions and analyzed for F1 protein content (Bradford assay), total amino acid content (TAA), molecular weight distribution, MW (by reduced SDS-PAGE) and assembly (native PAGE). Each of these analyses was conducted after 1, 3, 6, and 12 months of storage under ambient (25° C.) and refrigeration (5° C.) conditions. Samples showing 50% or more RuBisCO retention after 3 months of storage were extracted and proteins were recovered for comparison to proteins obtained from fresh tobacco leaves. Dehydrated tobacco extraction was carried out after 6 months of ambient storage, and generally involved the following steps: disperse dehydrated tobacco in buffer (bicarbonate/carbonate/metabisulfite); raise the temperature to 38-40° C. and hold with gentle stirring for an hour; hold with no heat for 8 hours; use screw press to separate extract from fiber solids; pass juice through centrifugation process; mix clarified juice with diatomaceous earth and filter press the mixture; pass the filtrate through filters (0.1 µm) and collect retentate; wash retentate and concentrate; spray dry retentate (to give RuBisCO); pass permeate from 0.1 µm filter through 10 nm filter and collect retentate; wash retentate and concentrate; spray dry retentate (to give F2 protein). These spray dry samples were analyzed by Bradford assay, TAA, reduced SDS-PAGE, and moisture analysis and compared against protein obtained in a similar manner from freshly processed leaf.

TABLE 4

Storage of PowderPure processed tobacco leaves

| Sample | Storage temperature (° C.) | Time point | F1 protein content (g/kg) | Calculated F1 Protein retention (%) | TAA (g/kg) |
|---|---|---|---|---|---|
| Pureed green leaf | Ambient (25) | 0 | 9.5 | — | 17.5 |
| | | 1 day | 0.0 | 0 | 92.9 |
| | | 1 month | 8.1 | 85.2 | 113.6 |
| | Freezer (−21) | 1 day | 0.0 | 0 | 97.4 |
| | | 1 month | 8.5 | 89.5 | 114.7 |
| Whole leaf | Ambient (25) | 1 day | 0.0 | 0 | 123.2 |
| | | 1 month | 5.8 | 61.0 | 102.2 |
| | | 6 months | 0.0 | 0 | 327.2 |

This data shows an increase in TAA for up to one month of storage under ambient and freezer conditions for pureed leaf and six months of whole leaf storage under ambient conditions. Results for RuBisCO stability are somewhat inconsistent. As shown, samples showed no RuBisCO one day after processing, but were shown to contain 5.8-8.5 g/kg protein (as compared with 9.5 g/kg protein in the control). After 5 months of storage of the whole leaf material, again no RuBisCO was quantified. The method of sampling or the method of sample extraction could explain these inconsistencies. No 6-month data was obtained for the pureed green leaf samples due to difficulty in applying the fresh leaf extraction process to dried leaves without optimization.

TABLE 5

Storage of nutraREV ™ processed tobacco leaves

| Sample | Storage temperature (° C.) | Time point | F1 protein content (g/kg) | Calculated F1 Protein retention (%) | TAA (g/kg) |
|---|---|---|---|---|---|
| Group A (fresh) leaves | Ambient (25) | 0 | 15.1 | — | 15.6 |
| | | 1 day | 5.7 | 37.7 | 90.5 |
| | | 1 month | 6.7 | 44.4 | 68.1 |
| | | 3 months | 0.0 | 0 | 49.1 |
| | | 4 months | 0.0 | 0 | 44.0 |
| | | 6 months | 11.1 | 73.5 | 59.5 |
| Group B (decomposing/decomposed leaves) | Ambient (25) | 0 | 15.1 | — | 15.6 |
| | | 1 day | 17.3 | 115 | 91.8 |
| | | 1 month | 14.3 | 94.7 | 84.0 |
| | | 3 months | 0.0 | 0 | 58.9 |
| | | 4 months | 0.0 | 0 | 30.9 |
| | | 6 months | 6.0 | 39.7 | 36.8 |

This data shows a slight increase in TAA for up to one month of storage under ambient conditions for Group A leaves stored after nutraREV™\dehydration (increasing slightly but staying consistent for up to 6 months of storage). These TAA values are significantly lower than those of the tobacco processed by PowderPure (shown in Table 4). RuBisCO content for the Group A leaves decreased from 15.1 g/kg for the control to 6.7 g/kg after one month to below detection for 3-4 months but an 11.1 g/kg RuBisCO content was measured after 6 months of storage of the quantaREV-processed material. The Group B leaves exhibited a slight TAA increase trend, as for the Group A leaves. The RuBisCO content remained roughly the same after 1 month of storage and again, RuBisCO content was below detection for 3-4 months but a 6.0 g/kg RuBisCO content was measured after 6 months of storage. Again, the method of sampling or the method of sample extraction could explain these inconsistencies.

Example 3

Dehydration of Moist Snuff

Samples of moist snuff are dehydrated using the PowderPure process at atmospheric pressure (based on the disclosure of U.S. Pat. No. 6,539,645, which is incorporated herein by reference) or using a low temperature vacuum/microwave process, to give dehydrated snuff having varying moisture levels. The resulting dehydrated material is analyzed for citronellol and geraniol content (for natural moist snuff) and for methyl salicylate content (for wintergreen moist snuff).

TABLE 3

Organoleptic compounds in dehydrated natural snuff (PowderPure process)

| Natural Moist Snuff Form | Moisture (weight percent) | Citronellol (ppm, dry weight) | Geraniol (ppm, dry weight) |
|---|---|---|---|
| As-received | 52.69 | 31 | 31 |
| Dehydrated via PowderPure | 25.63 | 47 | 32 |
| Dehydrated via PowderPure | 17.46 | 32 | 26 |

TABLE 4

Organoleptic compounds in dehydrated wintergreen snuff (PowderPure process)

| Wintergreen Moist Snuff Form | Moisture (weight percent) | Methyl salicylate (menthol) (ppm, dry weight) |
|---|---|---|
| As-received | 53.17 | 30,000 |
| Dehydrated via PowderPure | 20.3 | 32,643 |
| Dehydrated via PowderPure | 6.87 | 9,065 |

TABLE 5

Organoleptic compounds in dehydrated natural snuff (vacuum/microwave process)

| Natural Moist Snuff Form | Moisture (weight percent) | pH | Citronellol (ppm, dry weight) | Geraniol (ppm, dry weight) |
|---|---|---|---|---|
| As-received | 52.69 | 7.58 | 34.7 | 64.4 |
| Dehydrated via Vacuum/Microwave | 18.71 | 6.96 | 58.4 | 73.2 |
| Dehydrated via Vacuum/Microwave | 9.52 | 6.8 | 41.9 | 54.5 |

TABLE 6

Organoleptic compounds in dehydrated wintergreen snuff (vacuum/microwave process)

| Wintergreen Moist Snuff Form | Moisture (weight percent) | pH | Methyl salicylate (menthol) (ppm, dry weight) |
|---|---|---|---|
| As-received | 53.17 | 8.39 | 55,195 |
| Dehydrated via Vacuum/Microwave | 19.1 | 7.8 | 31,086 |
| Dehydrated via Vacuum/Microwave | 10.14 | 7.65 | 24,259 |

The data of Tables 3-6 indicate that dehydration of moist snuff can provide dried snuff that maintains a significant amount of desirable organoleptic properties. The results demonstrate that the natural product can be dehydrated to at least about 18% moisture without substantial loss in flavor characteristics using both the PowderPure and Vacuum/microwave processes, and the wintergreen product can be dehydrated to 20% without significant flavor loss advantageously with the PowderPure process.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method comprising using light energy or microwave energy, optionally in combination with vacuum pressure, to remove at least about 20% by weight of the water from a tobacco snuff product, giving a dehydrated tobacco snuff product, wherein the dehydrated tobacco snuff product retains at least about 80% by dry weight of the organoleptic compounds in the tobacco snuff product following dehydration.

2. The method of claim 1, wherein the organoleptic compounds comprise one or more of citronellol, geraniol, and methyl salicylate.

3. The method of claim 1, wherein the dehydrated tobacco snuff product comprises less than about 10% water by weight.

4. The method of claim 1, wherein the dehydrated tobacco snuff product comprises less than about 5% water by weight.

5. The method of claim 1, wherein the dehydrated tobacco snuff product comprises less than about 2% water by weight.

6. The method of claim 1, wherein the dehydrated tobacco snuff product comprises less than about 1% water by weight.

* * * * *